United States Patent [19]

Causer

[11] 4,367,998
[45] Jan. 11, 1983

[54] MANIPULATORS

[75] Inventor: Roy Causer, Wantage, England

[73] Assignee: United Kingdom Atomic Energy Authority, London, England

[21] Appl. No.: 184,304

[22] Filed: Sep. 5, 1980

[30] Foreign Application Priority Data

Sep. 13, 1979 [GB] United Kingdom ............... 7931801

[51] Int. Cl.³ ............................................. B25J 3/02
[52] U.S. Cl. ......................................... 414/4; 414/1;
414/730; 414/735; 414/917
[58] Field of Search ....................................... 414/1-8,
414/730, 732, 735, 917

[56] References Cited
U.S. PATENT DOCUMENTS 3,241,687 3/1966 Orloff ..................................... 414/5
3,630,389 12/1971 Schmidt et al. .

FOREIGN PATENT DOCUMENTS 973101 10/1964 United Kingdom .

Primary Examiner—Jeffrey V. Nase
Attorney, Agent, or Firm—William R. Hinds

[57] ABSTRACT

A manipulator consisting of a slave assembly, a master unit, and a control circuit. The movement of the various components of the slave assembly are actuated by electric stepping motors, and the slave assembly itself comprises a pantograph linkage having a wrist at one end of an extended link of the linkage. A jaw assembly connected to the wrist is arrranged to be operated by a fluid circuit which is pressurized by an electric pump and regulated by the action of a throttling device that has a plunger held over an opening by an electric solenoid. Movement of the plunger is detected by the change of impedance of a sensing coil as the plunger enters the coil.

7 Claims, 21 Drawing Figures

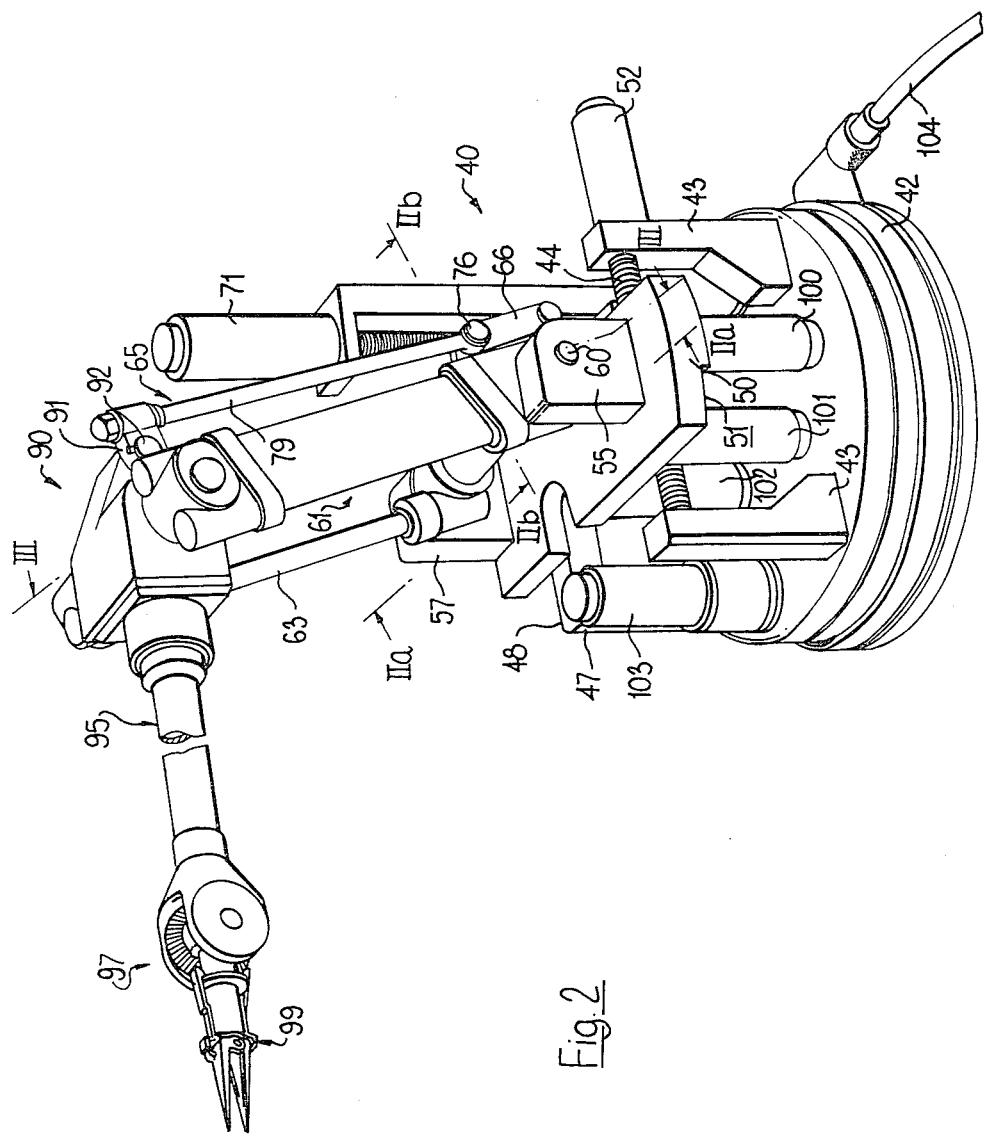

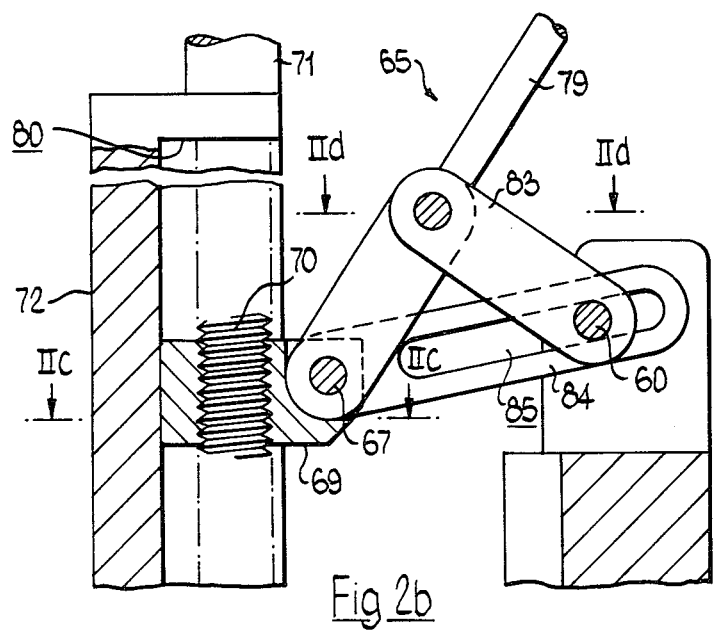
Fig. 2b
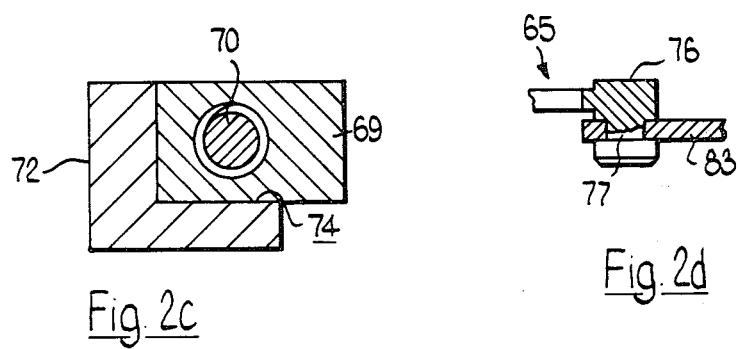
Fig. 2c
Fig. 2d

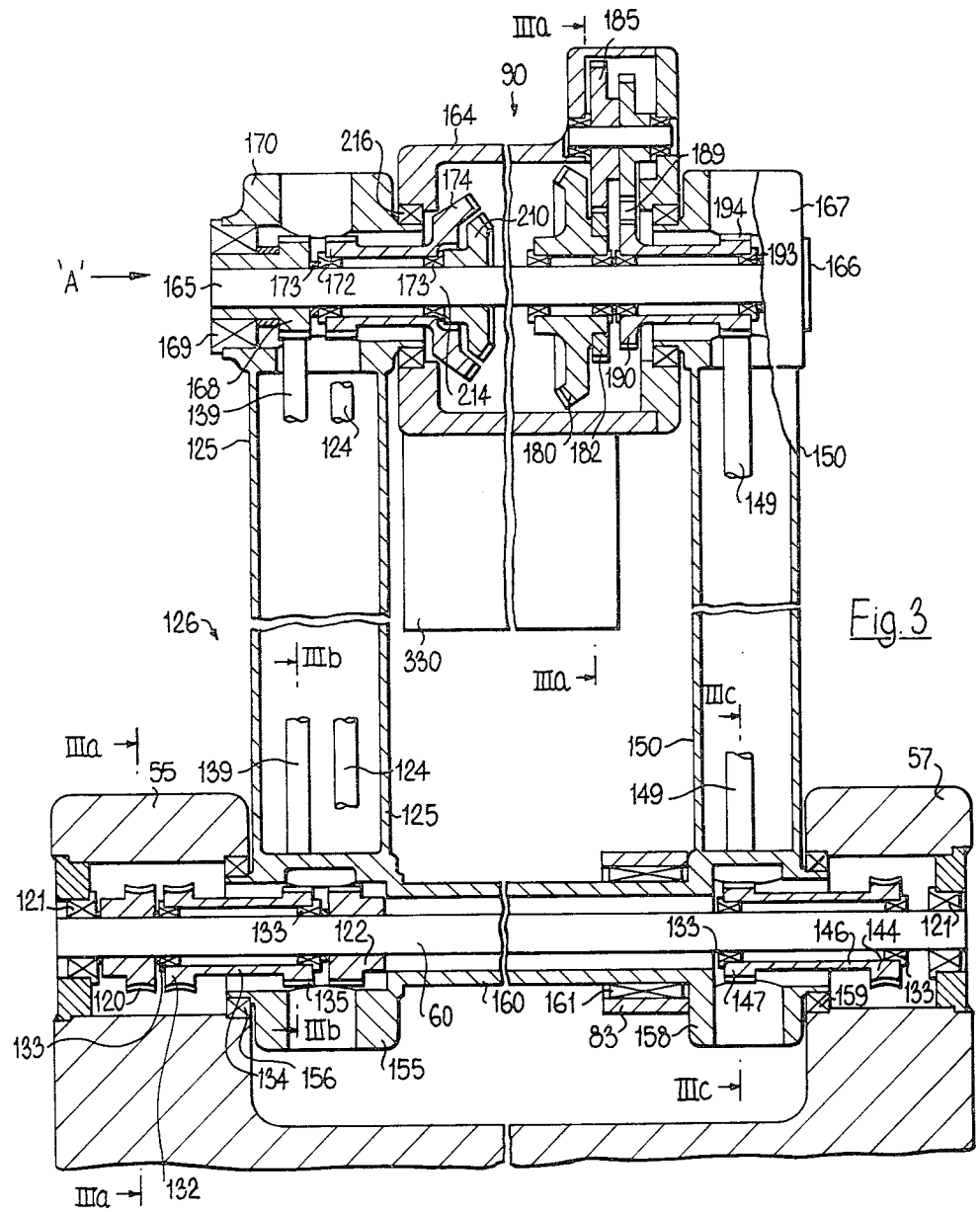

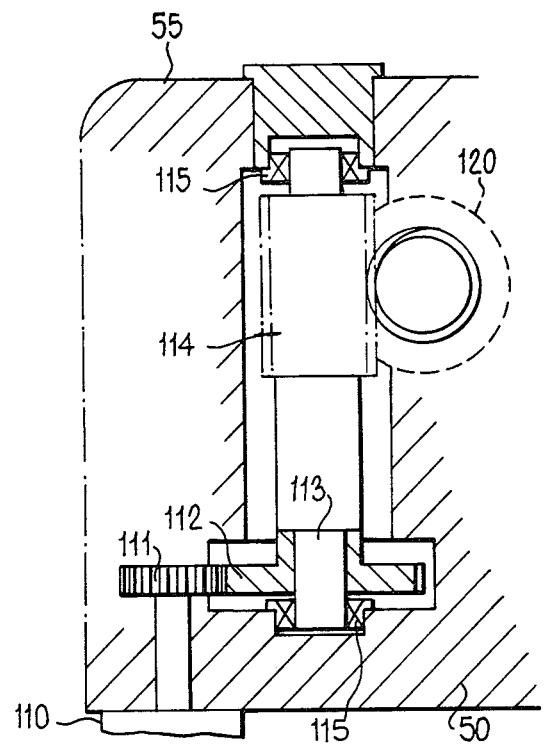
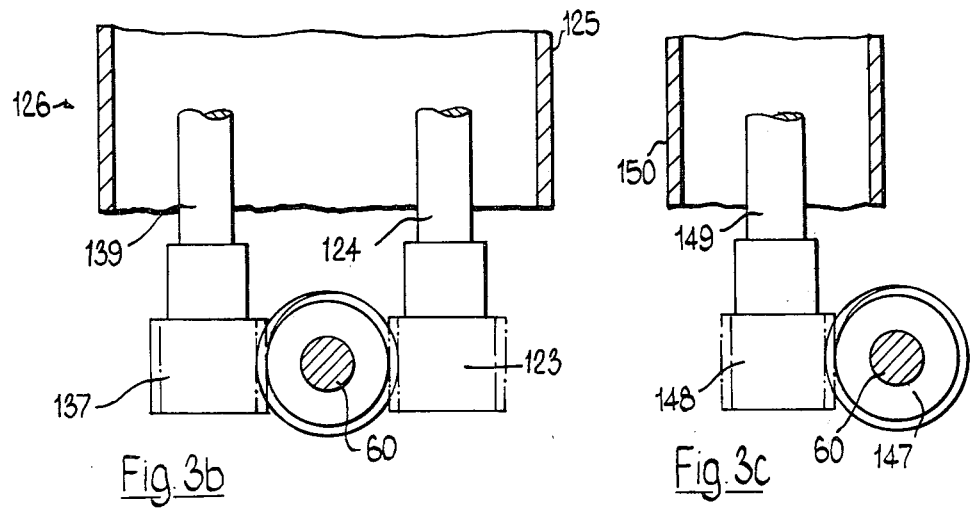
Fig. 3a
Fig. 3b
Fig. 3c

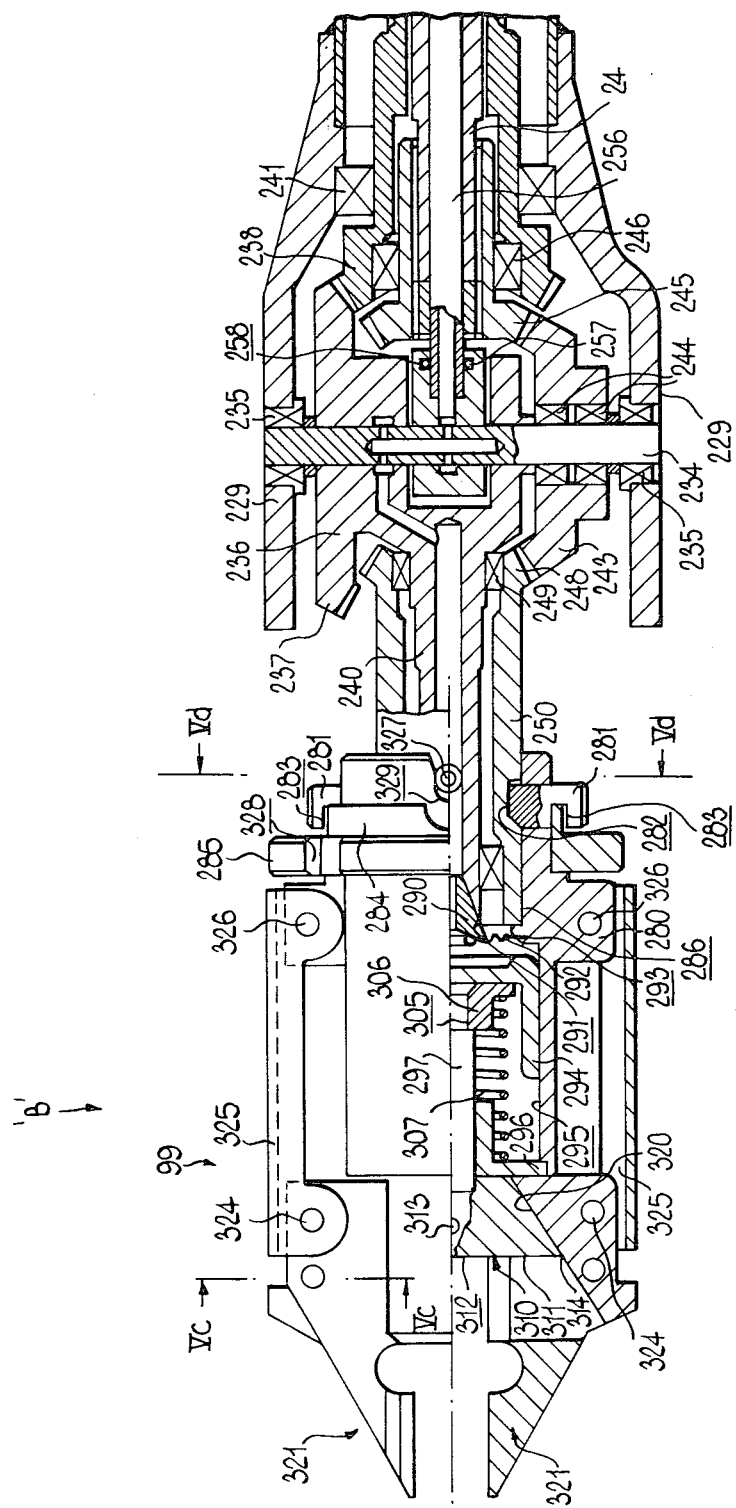

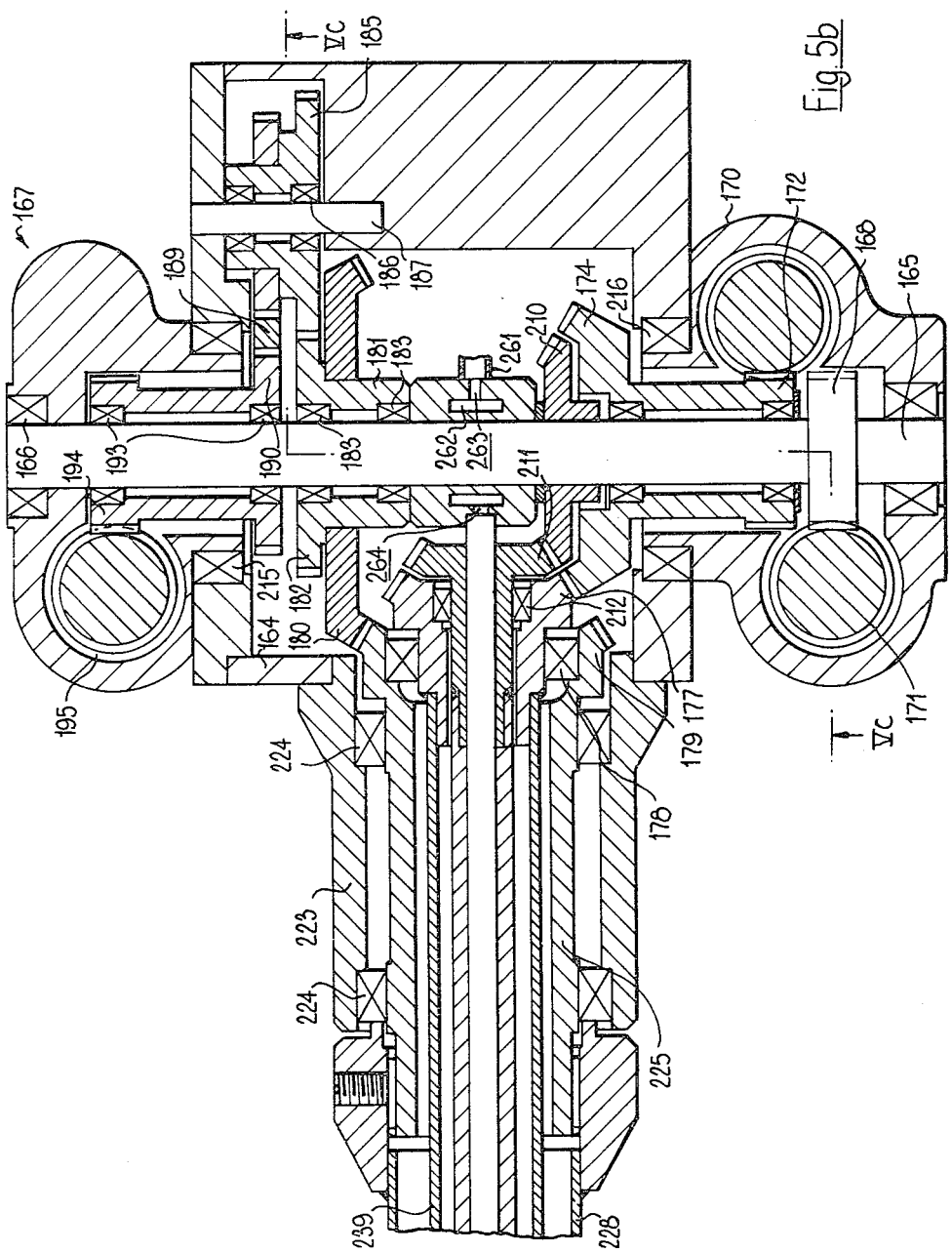

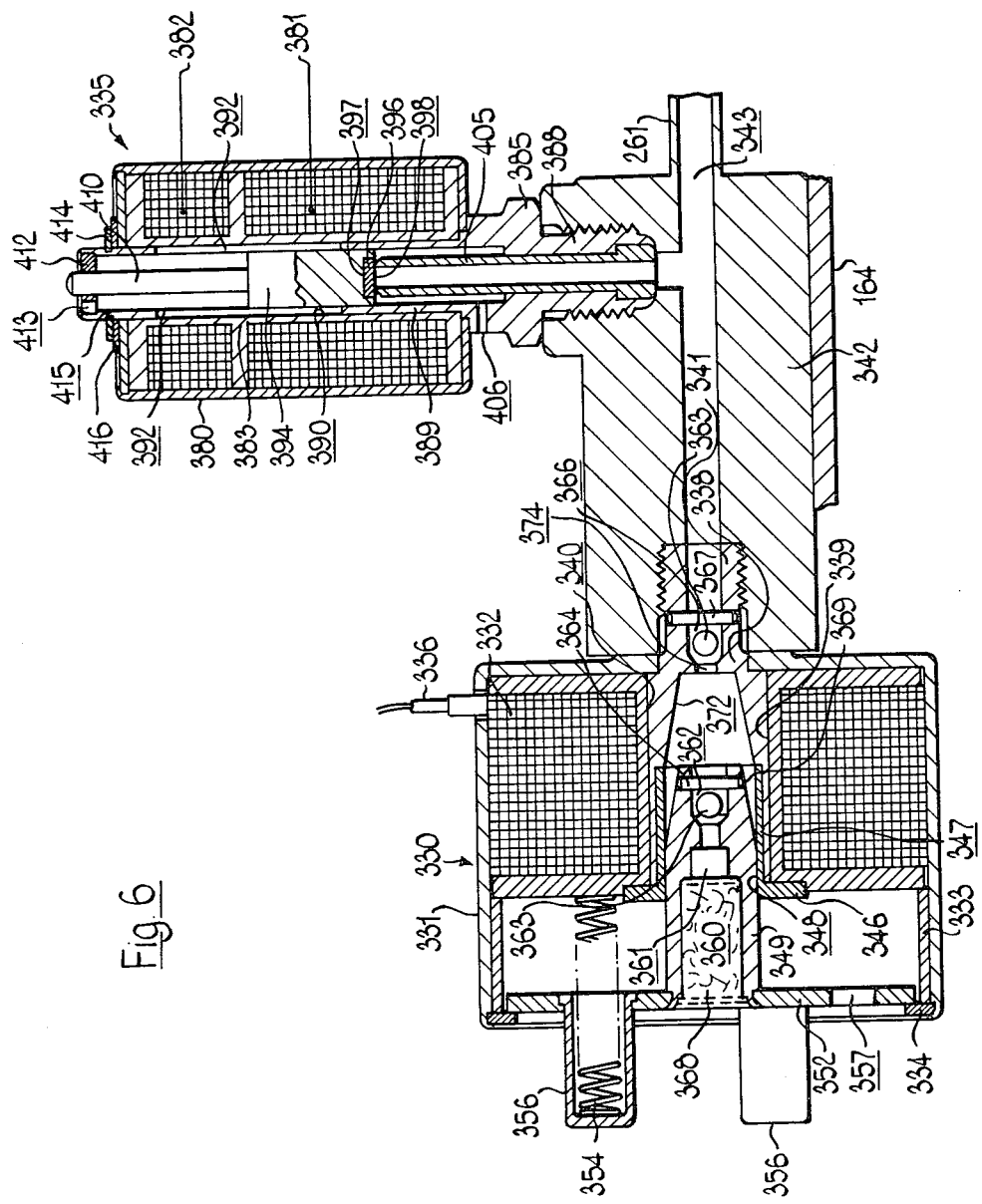

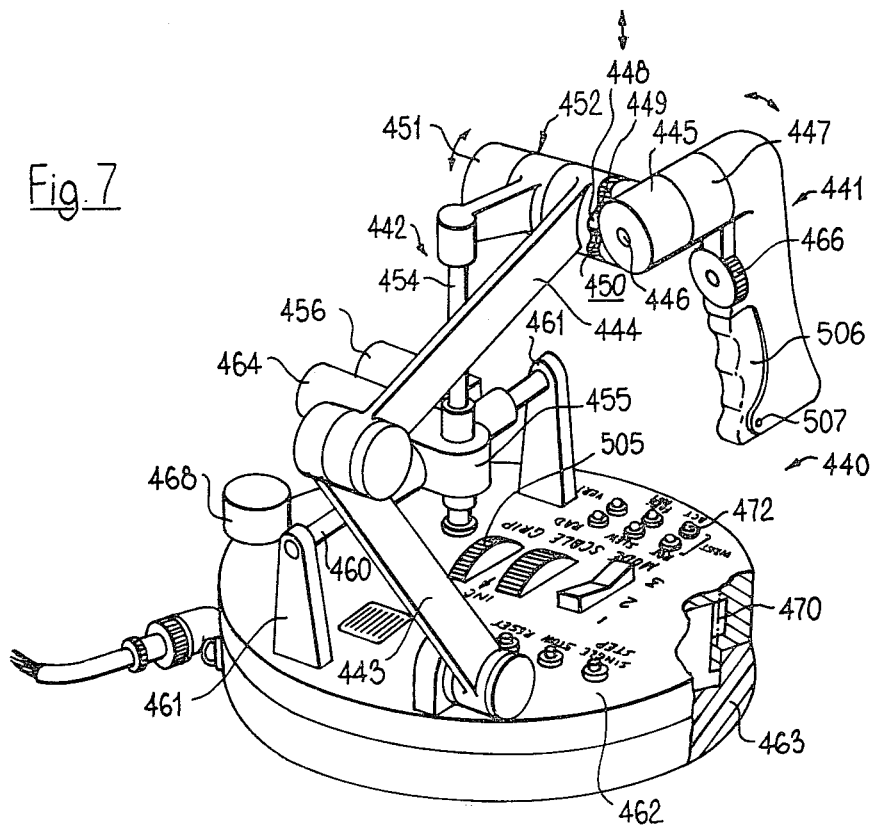
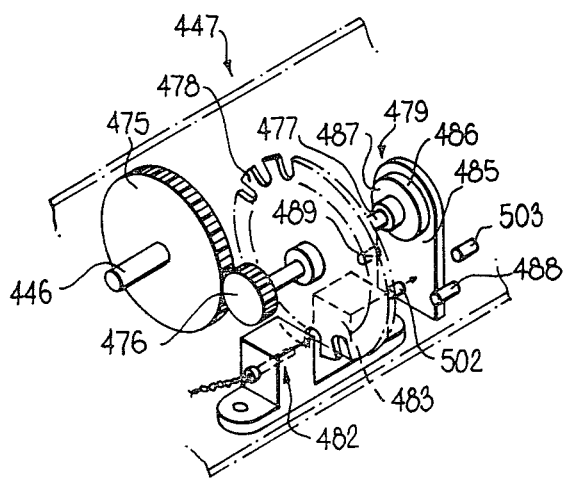

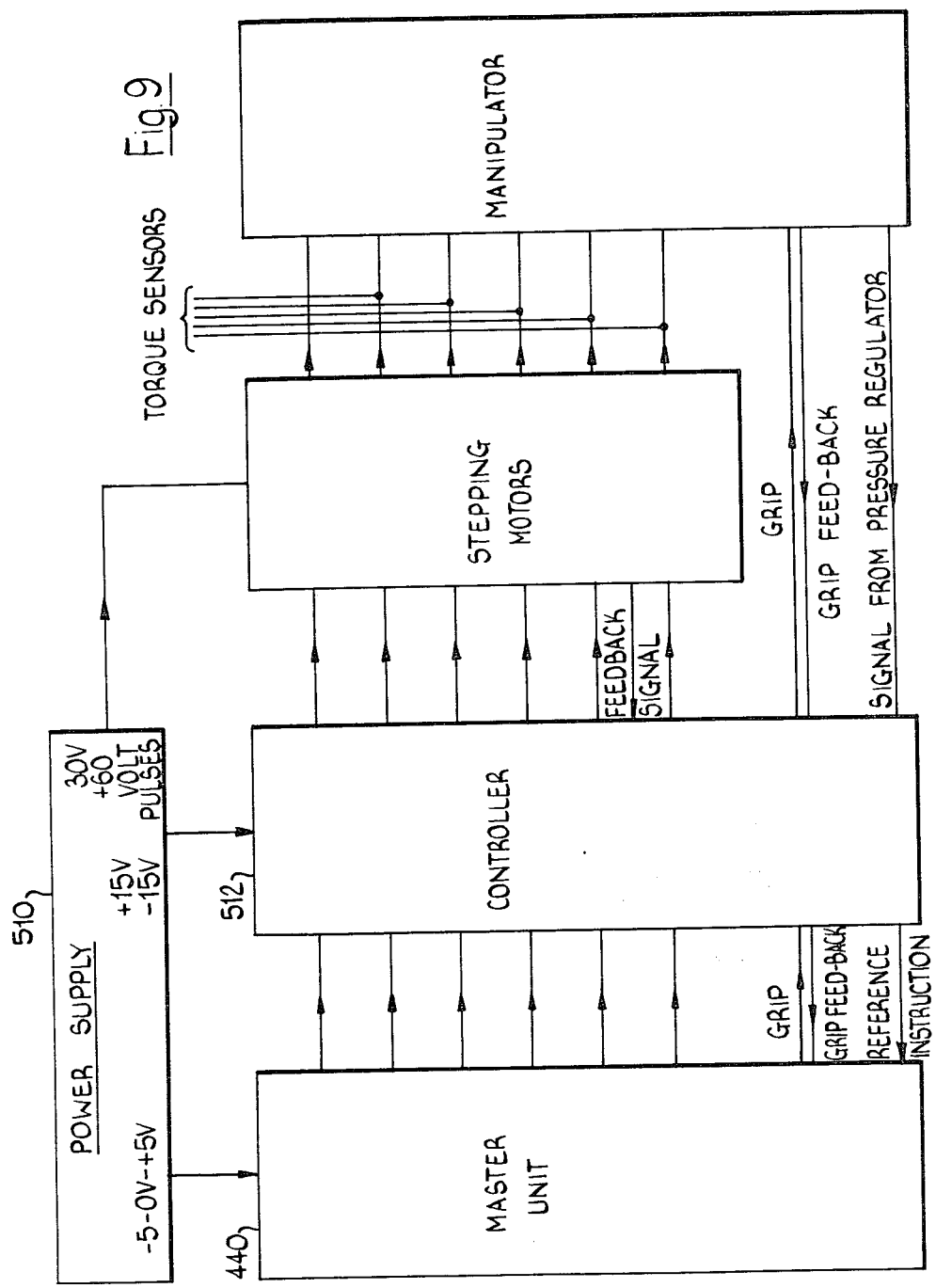

MANIPULATORS

This invention relates to a manipulator, and more particularly but not exclusively to a remote-control manipulator for use in a radioactive environment.

According to the present invention there is provided a manipulator comprising a master assembly, a slave assembly comprising a pantograph mechanism having a wrist means at one end of an extended link of the mechanism, and drive means including stepping motor means controllable from the master assembly and for displacing the mechanism and the wrist means.

Preferably, the wrist means is displaceable by rotation of rotary members extending along the line of at least some links of the mechanism.

A jaw assembly may be connectable to the wrist means and operable by fluid means.

One form of the manipulator according to the invention is adapted for handling small items (e.g. 300 grammes), and is compact so that it can be transferred through a port in a biological shield, the port subsequently being closed with a shielding bung.

The invention also includes a jaw assembly for a manipulator of the invention, the jaw mechanism being operable by a fluid circuit having a pressure regulator therein, the pressure regulator comprising a movable obturator arranged to be held against a vent by the action of an electric solenoid, and a sensing means for sensing movement of the obturator.

Preferably, means are provided for varying the electric current to the solenoid so as to produce a corresponding variation in the action of the solenoid on the obturator.

There is a specific need for handling items remotely in a radioactive environment, and also to do so without having a portion of the handling equipment extending through a biological shield since this might give rise to impaired radiation shielding at the penetration of the biological shield. Furthermore, because of the inherent difficulties of servicing equipment in a radioactive environment, the reliability of the control system for the handling equipment is of major importance. The invention therefore provides a manipulator which is under electrical control so that it is only necessary for the electric cables of the control system to penetrate the biological shield, and uses mechanical mechanisms driven by electric stepping motors in the slave assembly thereof to simplify the electric components used in the radioactive environment.

The invention will be further described by way of example only with reference to the accompanying drawings in which:

FIG. 2 shows to an enlarged scale a perspective representation of the slave assembly of FIG. 1;

FIG. 2b shows a fragmentary sectional view on the line IIb—IIb of FIG. 2;

FIG. 2c shows a fragmentary sectional view on the line IIc—IIc of FIG. 2b;

FIG. 2d shows a fragmentary sectional view on the line IId—IId of FIG. 2b;

FIG. 3 shows a fragmentary sectional view on the line III—III of FIG. 2;

FIG. 3a shows a fragmentary sectional view on the line IIIa—IIIa of FIG. 3;

FIG. 3b shows a fragmentary sectional view on the line IIIb—IIIb of FIG. 3;

FIG. 3c shows a fragmentary sectional view on the line IIIc—IIIc of FIG. 3;

FIG. 5a shows a fragmentary sectional view on the line Va-Vb of FIG. 4;

FIG. 5b shows another fragmentary sectional view on the line Va-Vb of FIG. 4;

FIG. 5d shows a fragmentary view in the direction of arrow 'B' of FIG. 5a;

FIG. 5e shows a fragmentary sectional view on the line Ve—Ve of FIG. 5a;

FIG. 5f shows a fragmentary sectional view on the line Vf—Vf of FIG. 5a;

FIG. 6 shows in section part of a fluid circuit for the manipulator of FIGS. 2 to 5f;

FIG. 7 shows a perspective representation of a master unit for controlling the slave assembly of FIGS. 2 to 6;

FIG. 8 shows to an enlarged scale part of the master unit of FIG. 7; and

FIG. 9 shows in block diagrammatic form an electric control circuit for the manipulator of FIGS. 2 to 8.

Figure 1:
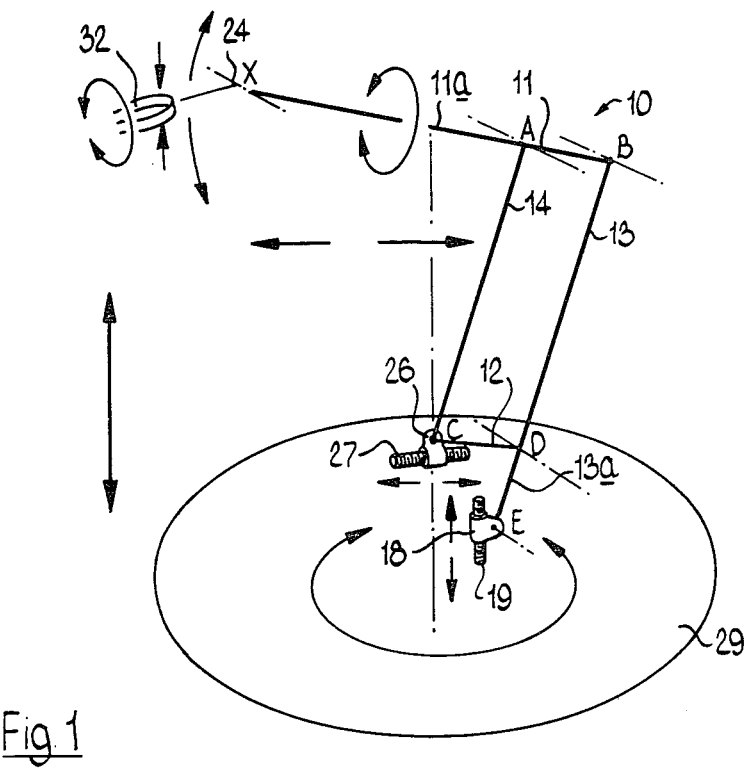
FIG. 1 shows a schematic perspective diagrammatic representation of a slave assembly of a manipulator.

Referring now to FIG. 1, the slave assembly shown comprises a linkage 10, having relatively end links 11, 12, and relatively long side links 13, 14 pivotally connected together at 'A', 'B', 'C', and 'D' to form a four bar chain having opposite links 11 and 12, or 13 and 14, parallel and of equal length. Side link 13 has an extension 13a which is pivotally attached at 'E' to a nut 18 on a vertically directed lead screw 19 that provides the vertical drive, and end link 11 has an extension 11a which has a wrist 24 at its far end, the length of the end link extension 11a being such as to present the pivotal centre 'X' of the wrist 24 in line with pivots 'C' and 'E', to arrange that the linkage 10 performs as a pantograph mechanism. Pivot 'C' is attached to a nut 26 on a horizontally directed lead screw 27 which provides the horizontal drive of the linkage 10. The linkage 10 is mounted on a rotatable horizontal base 29, and the base 29 and the respective lead screws 19, 27, are each arranged to be driven by a respective electric stepping motor (not shown). The linkage 10 is capable of transmitting a pivotal and a rotary movement to the wrist 24 which carries detachable jaw assembly 32 for gripping items, the jaw assembly 32 being of any convenient form but preferably being operable by means of fluid pressure (e.g. pneumatic pressure) conducted through the linkage 10.

The direction of movement of the various parts of the linkage 10 are shown by the arrows, and in operation, rotation of the vertical lead screw 19 displaces the nut 18 and thus the pivot 'E', and causes the linkage 10 to turn about the pivot 'C' thus displacing the wrist 24 vertically but such that the wrist pivot 'X' remains on a common line with the pivots 'C' and 'E'. Similarly, rotation of the horizontal lead screw 27 causes displacement of the nut 26 and thus of the pivot 'C', and produces a horizontal displacement of the wrist pivot 'X' which remains, however, on a common line with the pivots 'C' and 'E'. The linkage 10 can be rotated in a horizontal plane by appropriate rotation of the base 29, and the wrist 24 can be rotated through 360°, and pivoted to provide a wrist movement in a plane which includes the end link extension 11a.

Figure 2A:
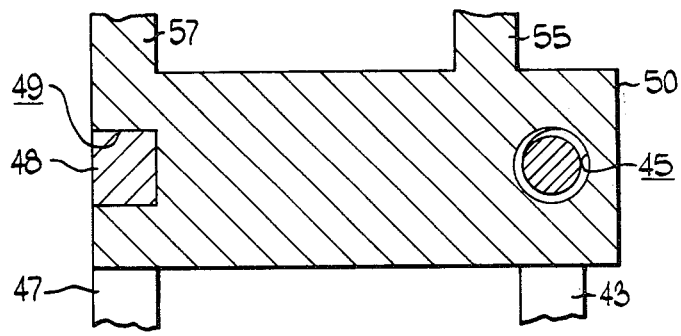
FIG. 2a shows a fragmentary sectional view on the line IIa—IIa of FIG. 2.
Figure 4:
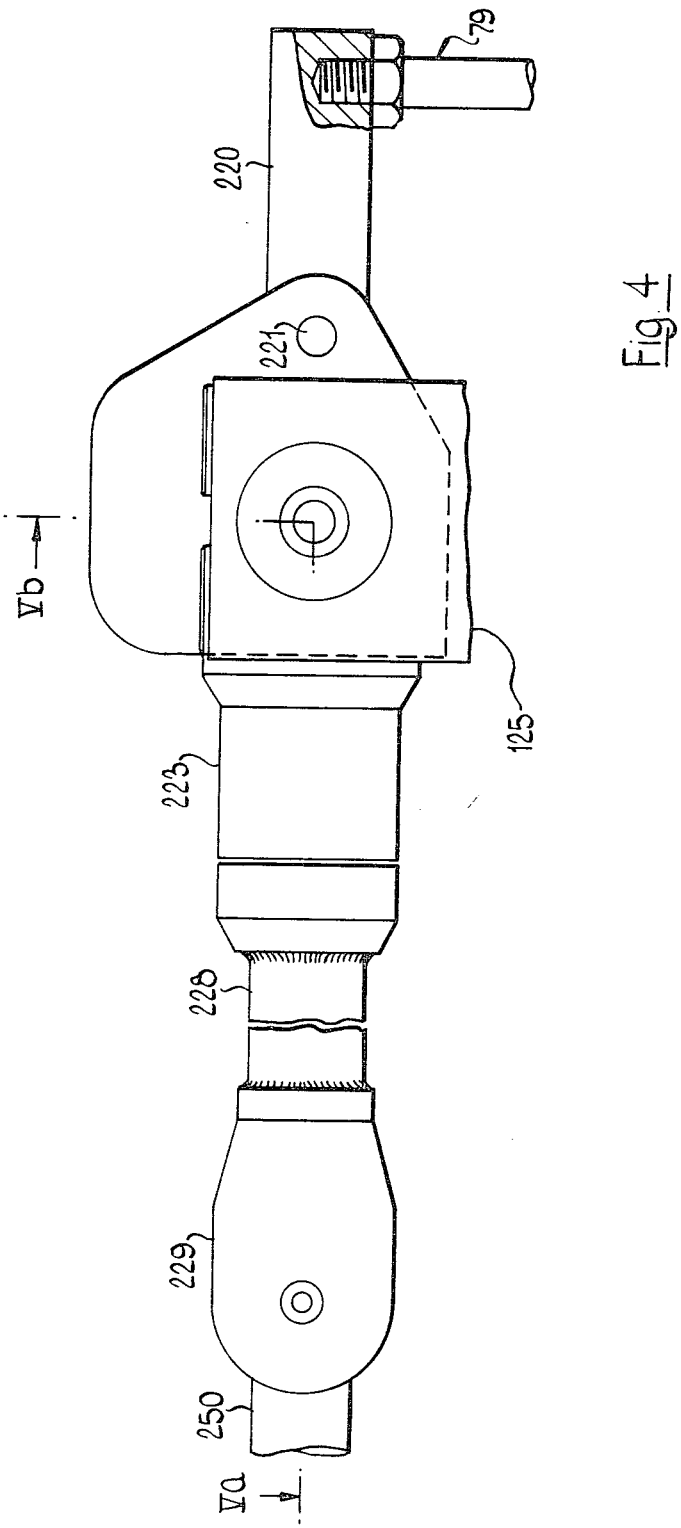
FIG. 4 shows a fragmentary view in the direction of arrow 'A' of FIG. 3.

Referring to FIGS. 2 and 2a, a slave assembly 40 is shown which embodies the principles exemplified in FIG. 1, and comprises a rotatable base 42 on which are mounted two posts 43 which rotatably locate a horizontal lead screw 44, and two posts 47 (only one is shown) which support between them a slide member 48. A carriage 50 having a recess 51 to clear the forward lead screw post 43 is mounted on the lead screw 44 and the slide member 48, so that as shown in FIG. 2a, the lead screw 44 extends through a complementary threaded hole 45 in the carriage 50 and the slide member 48 locates in a recess 49 in the carriage 50. An electric stepping motor 52 is connected to one end of the lead screw 44 so as to drive the lead screw 44 in a required direction and is secured to the post 43 at that end.

Two housings 55, 57 respectively support a rod 60 on which are pivotally mounted at the lower ends thereof, a double link assembly 61, and a single link assembly 63, the double link assembly 61 and the single link assembly 63 constituting the side link 14, and the longitudinal axis of the rod 60 constituting the pivot 'C' of FIG. 1.

A rear link 65 as shown in greater detail in FIG. 2b, is pivotally connected at its lower end on the shouldered peg 67 carried by a slider nut 69 on a vertically extending lead screw 70 which rotatably locates at each end (only the upper end is shown) in a slide member 72 and arranged at the upper end of the lead screw 70 to be driven by an electric stepping motor 71 secured to the slide member 72, the slide member 72 as shown in FIG. 2c providing a supporting right angular guide surface 74 to restrain rotation of the slider nut 69. Referring now to FIG. 2d, the lower portion of the rear link 65 includes a boss 76 from which a shouldered peg 77 protrudes and provides a pivot for a short link 83 which as shown in FIG. 2c is pivotally attached at its other end to the rod 60. A stop link 84 is pivotally attached to the peg 67 but has a slot 85 which locates about the rod 60, the length of the slot 85 mechanically limiting the vertical and the horizontal movement of the slave assembly 40 to prevent the rear link 65 and the short link 83 becoming too obtuse or acute with respect to each other. Referring again to FIG. 2, a rod 79 which constitutes the other portion of the rear link 65 is rigidly connected to the boss 76, and in relation to FIG. 1 the rear link 65 constitutes the side link 13, the peg 77 constitutes the pivot 'D', the rear link 65 below the boss 76 constitutes the side link extension 13a, and the peg 67 constitutes the pivot 'E'.

The upper portion of the double link assembly 61, and the single link assembly 63 pivotally support an elbow assembly 90, to which the rear link 65 is pivotally connected by a lug 91 to a peg 92 on the elbow assembly 90. A rotatable arm member 95 extends at one end from the elbow assembly 90, and at its other end has a wrist assembly 97 to which a jaw assembly 99 is removably attached.

Conventional gear drives (not shown) and located inside the slave assembly 40 transfer the drive from three stepping motors 100, 101 and 102 secured to the underside of the carriage 50 to rotate the arm member 95, to pivot the wrist assembly 97, or to rotate the jaw assembly 99 with respect to the wrist assembly 97 respectively. The gripping action of the jaw assembly 99 may be arranged by a hydraulic or a pneumatic circuit (not shown). A stepping motor 103 secured to the rotatable base 42 provides the rotary drive for the rotatable base 42 through a conventional internal and planetary gear combination (not shown). A conduit 104 carries the electric supplies (not shown) to the rotatable base 42 for the stepping motors 100, 101, 102, and 103.

In operation, actuation of the stepping motor 52 turns the horizontal lead screw 44 and moves the carriage 50 which corresponds to moving the pivot 'C' of FIG. 1, and actuation of the stepping motor 71 turns the vertical lead screw 70 which raises the rear link 65 and corresponds to raising the pivots 'E' and 'D' of FIG. 1. Similarly, actuation of the stepping motors 100, 101, 102 and 103 causes a corresponding movement of the arm member 95, the wrist assembly 97, the jaw assembly 99, or the rotatable base 42 respectively.

An example of a gear drive system for a slave assembly is shown in FIGS. 3 to 5f, and referring particularly to FIGS. 3 to 5d, an electric stepping motor 110 is mounted on the underside of the carriage 50 and supports a pinion 111 engaged with a gear 112 which is rigidly joined to a shaft 113 of a worm 114 that is supported in combined thrust and journal bearings 115 at each end thereof. The worm 114 is engaged with a worm wheel 120 in the arm 55 that is rigidly connected to the rod 60 which is mounted on combined thrust and journal bearings 121. A spiral gear 122 fixed to the rod 60 engages a spiral gear 123 joined to a shaft 124 which extends through a tubular portion 125 of one side of a front link 126. The spiral gears 122, 123 transmit a drive but also compensate for any angular movement of the double link assembly 61.

Another electric stepping motor (not shown) is mounted on the underside of the carriage 50 and arranged in an identical manner to that described in relation to the stepping motor 110 through an identical pinion 111, gear 112, and worm 114 (not shown) to drive a worm wheel 132 mounted on a pair of combined thrust and journal bearings 133 which are mounted on the rod 60. The worm wheel 132 is joined by a tubular portion 134 to a spiral gear 135 which engages a spiral gear 137 that is joined to a shaft 139 which extends through the tubular portion 125 of the front link 126.

A worm wheel 144 in the arm 57 is mounted on combined thrust and journal bearings 133 which are mounted on the rod 60 and is driven from an electric stepping motor (not shown) in an identical manner to that described in relation to the worm wheels 120 and 132, the worm wheel 144 being joined by a tubular extension to a spiral gear 147 which engages a spiral gear 148 that is joined to a shaft 149 which extends through a tubular portion 150 of the other side of the front link 126.

A swivel housing 155 which is joined to the tubular portion 125 is mounted on a journal bearing 156 located in the arm 55, and a swivel housing 158 which is joined to the tubular portion 150 is mounted on the journal bearing 159, the swivel housings 156, 158 being joined together by an intermediate tube 160 upon which a bearing 161 is mounted for the short link 83 (see FIG. 2b). The elbow assembly 90 is supported by the tubular portions 125, 150, and comprises a casing 164 and a drive rod 165 mounted at the right hand end thereof with respect to FIG. 3 in a journal bearing 166 located in an upper swivel housing 167 connected to the tubular portion 150, and at its left hand end has a spiral gear 168 rigidly mounted thereon and supported in a journal bearing 169, located in an upper swivel housing 170 connected to the tubular portion 125, the spiral gear 168 being arranged to mesh with a spiral gear 171 attached to the shaft 139. A spiral gear 172 mounted on bearings 173 on the drive rod 165 extends to a bevel gear 174 which engages a corresponding bevel gear 177 mounted inside a bearing 178 inside a bevel gear 179 which is driven by a bevel gear 180 extending from a boss 181 of a pinion 182 mounted on bearings 183 on the drive rod 165. The pinion 182 is engaged with a compound gear 185 which is mounted on bearings 186 themselves mounted on a stub shaft 187 extending from the casing 164 and cooperating through an idler gear 189 with a gear 190 mounted on bearings 193 on the drive rod 165 and having a spiral gear portion 194 which is engaged with a spiral gear 195 connected to the shaft 149.

A bevel gear 210 is secured to the drive shaft 165 and is engaged with a bevel gear 211 which is mounted inside a bearing 212 in the bevel gear 177. The upper swivel housing 167 locates in a bearing 215 in the casing 164, and the upper swivel housing 170 locates in a bearing 216 in the casing 164. A rear link 220 is pivotally connected to a rod 221 in the casing 164, and a stub tube 223 from the casing 164 locates bearings 224 for a tubular spigot 225 from the bevel gear 179 and which is joined to one end of an arm tube 228 of the arm member 95, the arm tube 228 having a fork assembly 229 at its other end.

A rod 234 extends between bearings 235 mounted in the fork assembly 229 and has a pivotal member 236 secured to it, the pivotal member 236 having both a bevel gear portion 237 which engages a bevel gear 238 joined to a tubular extension 239 from the bevel gear 177 and located by a bearing 241 in the fork assembly 229, and a hollow stub portion 240. A bevel gear 243 mounted on bearings 244 engages a bevel gear 245 located in bearings 246 and joined to a tubular extension 247 from the bevel gear 211, and also engages a bevel gear 248 mounted on bearings 249 on the stub portion 240 and having a tubular extension 250.

The jaw assembly 99 is arranged to be operated by a fluid circuit extending through the hollow stub portion 240, the rod 234, and a tube 256 located at one end in the pivotal member 236 where it is sealed by an 'O' ring seal 257 in an annular groove 258 and at its other end is located in a sleeve 260 mounted as a clearance fit on the drive rod 165, the sleeve 260 having an outlet pipe 261 connected at one end to the tube 256 by an annular groove 262, and by two ducts 263, 264 respectively, in the sleeve 260.

The jaw assembly 99 comprises a housing 280 held on the tubular extension 250 by diametrically opposed pins 281 which locate in a circumferential groove 282 in the tubular extension 250. Each pin 281 has a slot 283 in which a cam strip 284 extends to effect radial displacement of the pins 281, the cam strip 284 projecting from an annular disc 285 rotatably mounted on a journal portion 286 of the housing 280.

An inlet port 290 having a frusto-conical periphery provides a seating for a corresponding frusto-conical seating 291 in the hollow stub portion 240, and is secured to an annular diaphragm 292 which locates in a slot 293 in the housing 280 so as to bias the inlet port 290 towards the seating 291. A hollow cylindrical plunger 294 closed at one end slidably locates in a cylindrical bore 295 in the housing 280, the bore being closed by a flanged spigot 296 through which a rod 297 extends. The rod 297 has at one end a relieved portion 305 on which a shouldered bush 306 is fixed in abutting relationship with the plunger 294 and provides an end location for a compression spring 307 having its other end held against the flanged spigot 296.

Figure 5C:
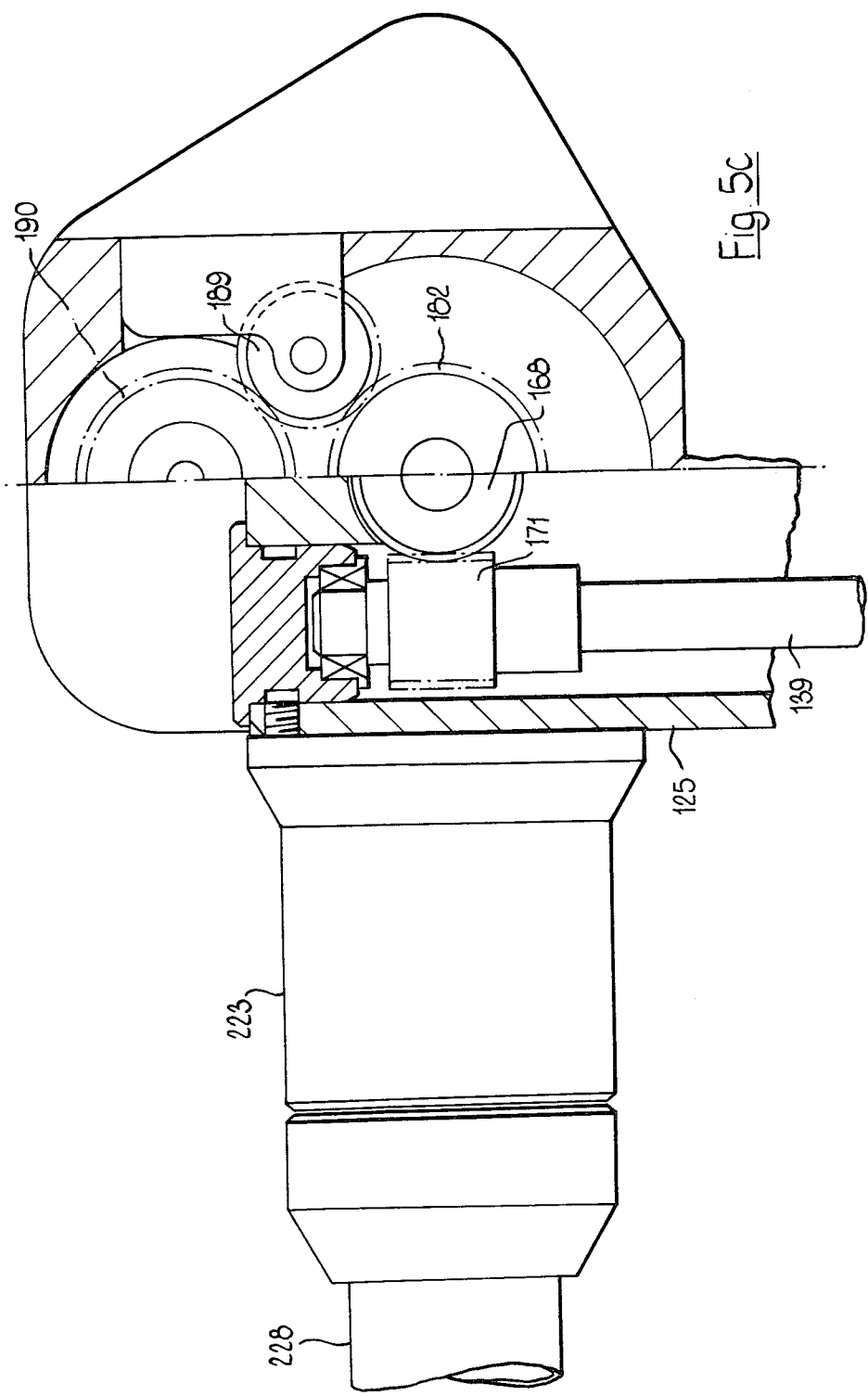
FIG. 5c shows a fragmentary sectional view on the line Vc—Vc of FIG. 5b.
Figure 5D:
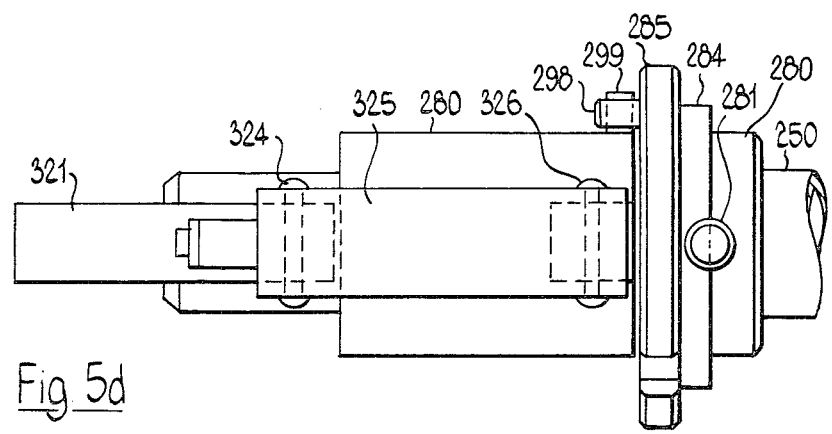
Figure 5E:
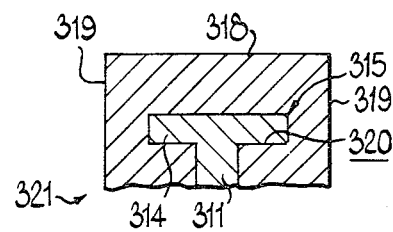

The rod 297 is also relieved at its other end to provide a location for a jaw actuator 310 which has a flat portion 311 that locates in a slot 312 in the rod 297, and is held therein by a rivet 313 and has angled T-shaped ends 314 each of which locates in a correspondingly angled slot 315 defined, as shown in FIG. 5e, between a bridging member 318 respective sides 319 of a cavity 320 in a jaw member 321 so that axial displacement of the jaw actuator 310 with respect to the jaw assembly 99 causes a corresponding transverse displacement of the respective jaw members 321.

Referring again to FIG. 5 and to FIG. 5d, each jaw member 321 is pivotally connected by a pin 324 to a respective link 325 which is pivotally connected by a pin 326 to the housing 280.

Figure 5F:
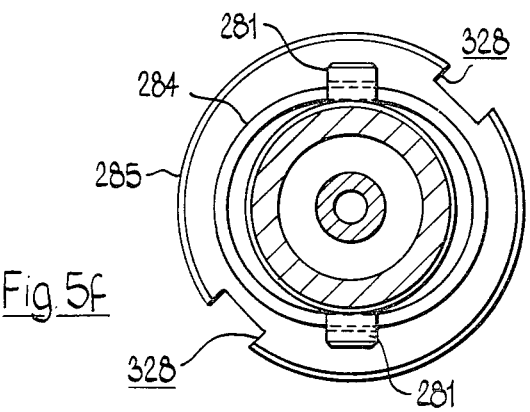

As shown in FIG. 5f, diametrically opposite grooves 328 in the annular disc 285 enable the annular disc 285 to be rotated so as to rotate the cam strip 284 and thus cause radial displacement of the pins 281 to withdraw them or insert them into the grooves 282. Two circumferentially spaced pegs 298 (only one is shown) projecting from the annular disc 285 locate about a radially extending peg 299 from the housing 280 to limit the rotation of the annular disc 285. In order to prevent the jaw assembly 99 itself from rotating when the annular disc 285 is rotated, two diametrically disposed pins 327 (only one is shown) project radially from the tubular extension 250 and locate in respective slots 329 in the housing 280.

The fluid pressure to operate the jaw assembly 99 as shown in FIG. 6 to which reference is made, is provided by an electric pump 330 and a pressure regulator 335 which are connected to the outlet pipe 261 and mounted in a convenient position on the casing 164 (see FIG. 3). The pump 330 comprises an open-ended pump casing 331 containing an electric solenoid 332 having an electrical lead 336 and which is held against the closed end of the pump casing 331 by a sleeve 333 of an electrical insulating material, the sleeve 333 being retained by a circlip 334 located in the pump casing 331. A metal port assembly 338 has a cylindrical surface portion 339 which locates in a bore 340 of the solenoid 332 and has a threaded spigot 341 for attachment to a body 342 having a duct 343 therethrough. A shouldered bush 346 locates in a bore 347 of the port assembly 338 and provides a bore 348 in which a soft iron plunger 349 slidably locates. The plunger 349 is connected to an apertured plate 352 which locates inside the sleeve 333 and is biased away from the solenoid 332 by three compression springs 354 (only one is shown) each located in a respective tubular housing 356 projecting in equispaced relationship from the plate 352, an aperture 357 in the plate 352 providing a vent for air trapped between the plate 352 and the solenoid 332.

The plunger 349 is of hollow form and has a cylindrical cavity 360 which connects through a stepped duct 361 to a chamber 362 in which a ball 363 of larger diameter than the duct 361 is retained by a pin 364. A similar arrangement is provided in the spigot 341 in which a ball 363 locates in a chamber 366 and is retained therein by a pin 367. The plunger 349 has a frusto-conical end 369 which is locatable in a corresponding frusto-conical cavity 372 in the port assembly 338 and which connects with a duct 374 that leads to the chamber 366. A fibrous material 368 such as glass fibre is packed into the cavity 360 to act as a filter for air sucked into the pump 330.

In operation of the pump 330, the solenoid is arranged to be energised by an intermittent direct current supply through the electrical lead 336, and thus alternately pulls the plunger 349 towards the cavity 372 against the bias of the springs 354 so as to displace air from the cavity 372 through the chamber 366 into the duct 343, and subsequently releases the plunger 349 so that it can be withdrawn from the cavity 372 by the springs 354 acting against the housings 356, air passing through the cavity 360 and the chamber 362 into the cavity 372.

The pressure regulator 335 comprises a casing 380 containing a solenoid 381 and a coil 382 each held in a bobbin 383. An outlet assembly 385 has a threaded spigot portion 388 which is secured to the body 342 and has a tubular sleeve 389 which extends through a bore 390 in the bobbin 383 and has two oppositely positioned slots 392 along it. A soft iron plunger 394 locates inside the sleeve 389 and has a resilient insert 396 of an elastomeric material such as Neoprene, in a cavity 397 so as to be capable of bearing against an opening 398 in an outlet tube 405 which extends from the threaded spigot portion 388, a vent 406 being provided in the outlet assembly 385 to prevent a back pressure developing in the space between the outlet tube 405 and the threaded spigot portion 388. The plunger 394 has an axially extending rod 410 which slides in a guide disc 412 at the end of the sleeve 389 and has a vent 413, the sleeve 389 being retained in the casing 380 by a circlip 414 which locates in a circumferential groove 415 in the outlet tube 405 and is spaced from the casing 380 by a washer 416.

In operation of the pressure regulator 335, the solenoid 381 is energised by a direct current supply (not shown) having a value to represent a desired air pressure, and the coil 382 is energised by an alternating current supply (not shown). The insert 396 is held against the opening 398 by the action of the solenoid 381 on the plunger 394 until the air pressure in the duct 343 exceeds the pressure exerted on the plunger 394 by the solenoid 381 and thus moves the plunger 394 away from the opening 398 so that air escapes from the opening 398 through the slots 392 and exhausts through the vents 413 and 406. This movement of the plunger 394 is sensed by a bridge circuit (not shown) from the change in the impedance of the coil 382. If desired the value of the direct current to the solenoid 381 may be changed to produce a higher or lower air pressure in the duct 343.

The slave assembly of FIGS. 3 to 6 is operable as shown in FIG. 7 by means of a master unit 440 which comprises a handle 441 mounted on a linkage 442 having two members 443, 444 respectively. The handle 441 is rotatably connected to a boss 445 by a rod 446 which passes through a transducer 447, the boss 445 being connected through an arm 448 to a transducer 451 by a rod 449 that is rotatably mounted in a bore 450 in an end 452 of the link member 444. The arm 448 is joined to one end of a vertical rack 454 that is moved through a gear box assembly 455 with vertical movement of arm 448 so as to drive a transducer 456. The gear box assembly 455 is mounted on a horizontal rack 460 supported by respective end posts 461 from a table 462 rotatably mounted on a base 463, and is joined to the link member 443 so that horizontal movement of the link member 443 moves the gear box assembly 455 along the horizontal rack 460 which is thus arranged to drive a gear assembly (not shown) in the gear box assembly 455 to rotate a transducer 464. A knurled knob 466 on the handle 441 is connected to a transducer (not shown) inside the handle 441, and a transducer 468 on the table 462 is arranged to be driven by rotation of the table 462 from an internal gear 470 co-axial with the table 462 and a planetary pinion (not shown) meshed with the internal gear 470 and connected to the transducer 468 so as to drive the transducer with rotation of the table 462. Indicator lights 472 on the table are arranged to be illuminated when a respective transducer 447, 451, 456, 464, 468, or the transducer connected to the knob 466, is being actuated, and each of the aforesaid transducers is shown in greater detail in FIG. 8 to which reference is made.

In FIG. 8, a drive, for example in the case of the transducer 447, the rod 446 is connected to a gear wheel 475 which is meshed with a pinion 476 mounted on one end of a shaft 477 upon which a toothed wheel 478 is mounted in an intermediate position along the shaft 477 and a friction drive assembly 479 is attached at the other end of the shaft 477. The toothed wheel 478 passes near its periphery between a light source 482 and a light detector 483 so that rotation of the toothed wheel 478 causes the beam from the light source 482 to be repeatedly interrupted thus producing a corresponding sequence of electric pulses from the detector 483 each pulse being used to produce a step of the corresponding stepping motor in the slave assembly of FIGS. 3 to 6. The friction drive assembly 479 comprises an arm 485 having a hollow cylindrical spigot 486 which fits around a boss 487 mounted on the shaft 477, the boss 487 having a friction material (not shown) such as compressed fibreboard around its periphery. The rotary movement of the arm 485 is restricted by two spaced-apart stops 488, 489 respectively, and a light source 502 and a light detector 503 are positioned so that the beam from the light source 502 is interrupted when the arm 485 is against one stop 488 or 489, and uninterrupted when the arm 485 is against the other stop 489 or 488, and since rotation of the shaft 477 in one direction causes the arm 485 to be held against one of the stops 488 or 489, and rotation of the shaft 477 in the other direction causes the arm 485 to be held against the other stop 489 or 488, the light detector 503 provides a signal which is indicative of the direction of rotation of the shaft 477, the absence of a signal from the light detector 503 indicating rotation of the shaft 477 in the opposite direction. Referring again to FIG. 7, a rotary switch 505 on the table 462 is arranged to supply a variable direct current to control the pressure exerted by the pump 330 (not shown), and the jump 330 is arranged to be actuated by a switch in the form of a trigger 506 pivotable at 507.

A control circuit for the manipulator is shown in block diagrammatic form in FIG. 9, and in FIG. 9 a power supply 510 provides a direct current of between −5 V to +5 V to the master unit 440 of FIG. 7, and the outputs from the master unit 440 are supplied to a controller 512 which is itself supplied with a direct current of −15 V to +15 V. The controller 512 which includes a binary rate multiplier, scalers, and a comparator, provides an output as appropriate to each individual stepping motor of the slave assembly of FIGS. 3 to 6, and also controls the output to the pump 330 and the pressure regulator 335. The stepping motors themselves are supplied with a 30 volts direct current upon which a 60 volts pulse is superimposed for 0.5 milliseconds each time a respective stepping motor is actuated to make a step, and are each connected to a rsespective torque sensor which provides a feedback signal to the controller 512 when a pre-determined torque has been exceeded by the respective stepping motor. On receipt of the feedback signal the controller 512 cancels the output to the respective stepping motor.

An example of a suitable stepping motor for the slave assembly of FIG. 2 is provided by a Messrs. Calderon Limited, size 08, five phase, ten step, stepping motor. The pump 330 might operate at about 50 strokes per second at a fluid pressure of about 20 lbs/ins.

The light source 482 and the light detector 483 might comprise a light emitting diode (not shown) and a photo-diode (not shown) respectively. As an alternative to the arrangement shown in FIG. 8, the light emitting diode and the photo-diode might be angularly displaced with respect to each other, with the light emitting diode arranged to direct light on to a reflective toothed periphery of an interruptor member such as the toothed wheel 478 so as to provide a repeatedly interrupted light signal to the photo-diode.

It will be understood that the control circuit of FIG. 9 may be programmed to restore the slave assembly of FIG. 2 in a desired datum position on the initiation of a signal from the master unit of FIG. 7, and the control circuit may also be arragned so as to allow movement of a selected one of the stepping motors but to hold the other stepping motors stationary.

Scaler means (not shown) may be provided in the controller 512 of FIG. 9 to apply a scaling factor when desired to a selected output from the master unit 440 by multiplying or dividing selected pulse outputs from the master unit 440, the respective stepping motor thus being actuated by a pulse output to which the scaling factor has been applied. This scaling factor has one application when increased sensitivity for fine movements of the slave assembly is desired. Other variations on the control of the stepping motors may be introduced to provide a desired action of the slave assembly.

In order to reduce the frictional component of the lead screws, if desired nuts engaging the lead screws through a plurality of balls (not shown) may be used.

The slave assembly of FIGS. 2 to 6 is essentially open loop and therefore under visual control although the use of the torque sensors inhibits the stepping motors from being overloaded.

Although the invention has been described in relation to the use of a pneumatically operated jaw assembly, the manipulator of the invention may be used with alternative jaw assemblies.

I claim:

1. A manipulator comprising,
   (a) a slave assembly comprising,
   (i) first and second relatively short links, the first link being longer than the second link;
   (ii) third and fourth relatively long links, the fourth link being longer than the third link, the first link and the second link each being pivotally connected to the third link and to the fourth link to form a four bar chain linkage, the pivotal connections being positioned so that the linkage has opposing members of equal length between pivots and in parallel relationship;
   (iii) a portion of the first link extending away from the linkage at the pivotal connection of the first link with the third link;
   (iv) a portion of the fourth link extending away from the linkage at the pivotal connection of the fourth link with the second link;
   (v) two lead screw means extending in mutually perpendicular relationship in a common plane that includes the four bar chain linkage;
   (vi) two nut means, one for each lead screw means, one said nut means being pivotally connected to the extending portion of the fourth link, the other said nut means being pivotally connected to the pivotal connection of the second link with the third link;
   (vii) a member for connection to a jaw mechanism and pivotally connected to the extending portion of the first link, the pivotal connections of the jaw connection member and of the extending portion of the fourth link, and the pivotal connection of the second link with the third link, being arranged to lie in a common straight line; and
   (viii) two electric stepping motors, one for each lead screw means, for rotating said lead screw means;
   (b) a master assembly comprising an electric control means for controlling the electric stepping motors, and
   (c) electric connection means for connecting the electric control means to the electric stepping motors.

2. A manipulator as claimed in claim 1, wherein the slave assembly is mounted on a rotatable base, and an electric stepping motor is provided for rotating the base and being controlled by the control means.

3. A manipulator as claimed in claim 1, further comprising rotary members extending substantially parallel to the line of at least some of the said links, the rotary members being drivably connected to the jaw mechanism connection member, and electric stepping motors drivably connected to the rotary members and controlled by the control means.

4. A manipulator as claimed in claim 1, further comprising a detachable jaw mechanism connectable to the jaw mechanism connection member, and fluid means for operating the jaw mechanism.

5. A manipulator as claimed in claim 1, or claim 2, or claim 3, or claim 4, wherein the master assembly further comprises, a manually operable master mechanism for producing movements related to selected displacements of the slave assembly, and transducer means of the control means for producing signal pulses related to said movements of the master mechanism so as to control respective said stepping motor means thereby.

6. A manipulator as claimed in claim 5, wherein the transducer means comprises,
   (a) a light source;
   (b) a detector for light from said light source so as to provide an electric signal in response to said light;
   (c) a toothed wheel positioned relative to the light source and the light detector such that rotation of the wheel causes the teeth thereof to repeatedly interrupt the light from the light source to the detector so that the detector provides corresponding electric signal pulses therefrom; and
   (d) means connecting the toothed wheel to the master mechanism such that a respective movement of the master mechanism causes rotation of the toothed wheel.

7. A manipulator as claimed in claim 6, further comprising,
   (a) an arm pivotable about an axis;
   (b) friction drive means for pivoting the arm, the friction drive means drivably connecting the arm to the toothed wheel so as to pivot the arm as the toothed wheel rotates;
(c) two stops angularly displaced with respect to the axis and disposed one at each side of the arm, for limiting the extent of pivotal movement of the arm;
(d) a light source; and
(e) a light detector for receiving light from said light source, the light source and the light detector being positioned relative to the arm such that light from the light source to the light detector is interrupted when the arm is abutting one of the stops but said light is uninterrupted when the arm is abutting the other of the stops, thereby indicating the pivotal direction of the arm.

* * * * *